United States Patent [19]

Doring et al.

[11] Patent Number: 4,599,628

[45] Date of Patent: Jul. 8, 1986

[54] MICROPLANAR INK-JET PRINTING HEAD

[75] Inventors: Michael Doring; Horst K. Bentin; Herman F. L. Maier, all of Hamburg, Fed. Rep. of Germany

[73] Assignee: U.S. Philips Corporation, New York, N.Y.

[21] Appl. No.: 672,513

[22] Filed: Nov. 19, 1984

[30] Foreign Application Priority Data

Nov. 26, 1983 [DE] Fed. Rep. of Germany ....... 3342844

[51] Int. Cl.⁴ .............................................. G01D 15/18

[52] U.S. Cl. ................................................ 346/140 R

[58] Field of Search ................................ 346/75, 40 R

[56] References Cited

U.S. PATENT DOCUMENTS 4,367,480 1/1983 Kotoh ............................ 346/140 R 4,370,663 1/1983 Markham .................... 346/140 R X 4,520,374 5/1985 Koto .............................. 346/140 R

*Primary Examiner*—E. A. Goldberg

*Assistant Examiner*—Gerald E. Preston

*Attorney, Agent, or Firm*—David R. Treacy

[57] ABSTRACT

A plate, through which several ink ducts extend, merges at a flat side of the plate into nozzles and at the opposite side into separated pressure chambers. The printing head has a diaphragm plate common to all pressure chambers, connected to a one-piece piezoceramic plate, which has an embossed part overlying each pressure chamber. Film electrodes are provided on each embossed part, extending above and beyond the area of the pressure chamber. Electrical connections are made to the film electrodes outside the area above the pressure chambers so that the mass of the electrical connections does not affect the resonant frequency.

14 Claims, 6 Drawing Figures

MICROPLANAR INK-JET PRINTING HEAD

BACKGROUND OF THE INVENTION

The invention relates to an ink-jet printing head comprising a plate-shaped body, in which several ink ducts extend, which empty into nozzles at a flat side of the body, and at the opposite side communicate with separate pressure chambers, the ink ducts being connected to an ink supply system. The printing head further comprises a diaphragm plate common to all pressure chambers and a one piece piezoceramic plate which is connected to the diaphragm plate and has a respective embossed part at the area of each pressure chamber, the embossed parts carrying film-shaped electrodes provided with electrical connections.

Such an ink-jet printing head is already known from German Auslegeschrift No. 2256667. The embossed parts of the piezoceramic plate have dimensions, which correspond to the dimensions of the pressure chambers arranged below them. If these dimensions are reduced, so that thus the density of the ink ducts and pressure chambers, respectively, present in the body can be increased, the resonance conduct of the piezoceramic embossed parts is strongly influenced on contacting of the electrode layers by means of electrical wires when the contacting wire is arranged immediately above the pressure chamber, because with these small dimensions of the embossed parts the contact wire has a mass comparable with them. If this mass is arranged at the area of the bending, the resonance conduct of the piezoceramic embossed parts and hence also the driving voltage required for the expulsion of a drop are changed.

SUMMARY OF THE INVENTION

The invention has for its object to provide an ink-jet printing head of the aforementioned kind, in which the resonance conduct of the piezoceramic embossed parts is not adversely affected by contacting wires even with a very close spacing of the pressure chambers in the starting body and with very small dimensions of the piezoceramic embossed parts.

According to the invention, this object is achieved in that the embossed parts of the piezoceramic plate extend beyond the area of the pressure chambers and in that the electrical connections are connected to the electrodes outside the area of the pressure chambers.

Thus, it is achieved that the contacting point on the electrode surface is located outside the actual bending range of a piezoceramic embossed part. An electrical wire connected at this area to the electrode surface therefore influences substantially no longer the resonance conduct of the part of the embossed part located above a pressure chamber.

The pressure chambers within an ink-jet printing head are usually of conical or cylindrical shape so that they have a circular-cylindrical cross-section. The piezoceramic embossed parts arranged above the pressure chambers may likewise have this cross-section and may be provided only at one point with a tag, which projects, beyond this cross-section and serves for contacting.

The embossed parts of the piezoceramic plate located above the pressure chambers may, however, also be of square or other rhombic shape. It has been found that these embossed parts arranged on pressure chambers having, for example, a cylindrical cross-section have accurately the same dynamic conduct as circular-cylindrical embossed parts. Hitherto it was assumed that the geometry of the embossed parts had to correspond as accurately as possible to the geometry of the pressure chambers.

The square or other embossed parts can be provided in a simple manner by means of saw-cuts in the piezoceramic plate, the piezoceramic plate being sawn to about 90% and the subjacent diaphragm plate not being damaged.

The subjacent circular pressure chambers are entirely covered by the respective rhombic shapes, so that a sufficient amount of space is available at the corner points of the shapes for arranging electrical contact wires.

According to an advantageous embodiment of the invention, the pressure chambers are arranged in the form of a closely spaced matrix, a nozzle being located on the other side of the body directly opposite to each pressure chamber.

The invention permits a comparatively small construction of the peizoceramic embossed parts and hence also of the pressure chambers arranged below them, so that the latter can be arranged with a very high density within an ink-jet printing head. Therefore, it is possible to provide a distribution of piezoceramic embossed parts which corresponds to the usual distribution of the nozzles on the other side of the body, that is to say that the piezoceramic elements have the same average relative distances as the nozzles. In this case the ink ducts extend at right angles to the flat extent of the body and interconnect the pressure chambers and nozzles, respectively, located directly opposite to each other. Of course, however, the ink ducts may also extend so as to be inclined with respect to each other.

Due to the comparatively short ink ducts, such an ink-jet printing head has a very high resonance frequency of the liquid system and hence a very high drop rate.

The use of the piezoceramic embossed parts according to the invention in conjunction with the very short pressure ducts moreover permits the construction of considerably smaller ink-jet printing heads than hitherto.

According to another advantageous embodiment of the invention, the ceramic plate carries further embossed parts provided with film-shaped electrodes, located between the pressure chambers.

The contact wires are first passed from the piezoceramic embossed parts arranged above the pressure chambers to the further electrodes, to which further connection wires can then be secured. This measure serves for additionally protecting the embossed parts arranged above the pressure chambers because during contacting of the connection wires with the further electrodes, attention need no longer be paid to the fact whether the latter are or are not in the resonating range of the embossed parts.

According to an advantageous further embodiment of the invention, the piezoceramic plate carries a diaphragm plate on the side remote from the embossed parts. The diaphragm is applied to it by electroplating and which consists, for example, of a nickel layer.

Due to the piezoceramic embossed parts, which in accordance with the invention can be manufactured with comparatively small dimensions, it becomes possible to choose the layer thickness of the diaphragm plate so small that it can be applied by electroplating. Therefore, a step of gluing a separate diaphragm plate to the piezoceramic plate may be dispensed with. Consequently, an ink-jet printing head in accordance with the invention can be manufactured more simply.

In order that the invention may be readily carried out, it will now be described more fully with reference to the accompanying drawings in which:

FIGS. *2a, b* show several sectional views of such an ink-jet printing head, and FIGS. *3a* to *c* show differently formed piezoceramic embossed parts.

DESCRIPTION OF THE PREFERRED EMBODIMENTS

Figure 1:
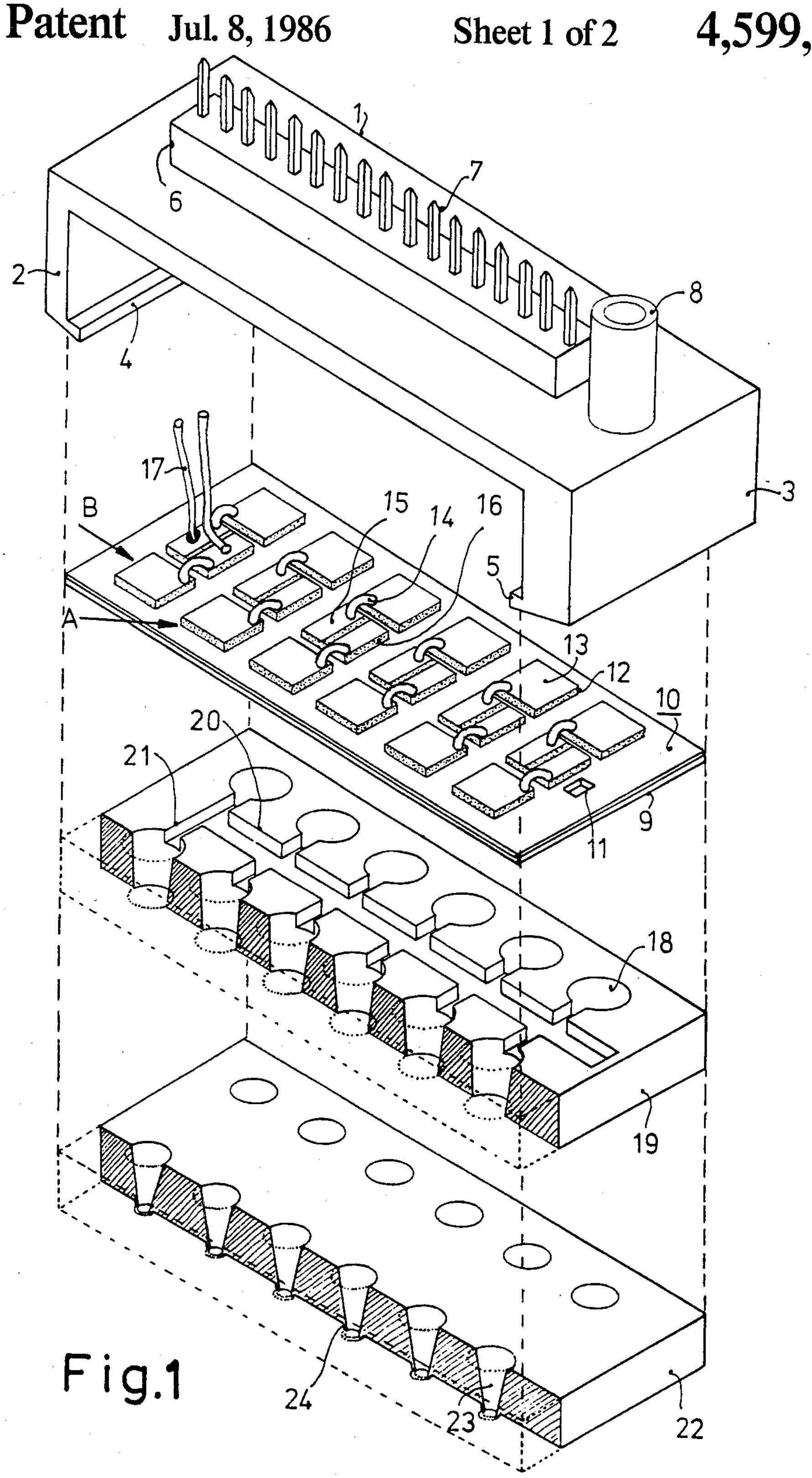
FIG. 1 is an exploded view of an ink-jet printing head according to the invention having square piezoceramic embossed parts.

FIG. 1 shows a microplanar ink-jet printing head according to the invention. It comprises an outer holding bracket 1, which has two lateral tags 2 and 3, which are provided with inwardly extending projections 4 and 5. All further structural parts of the ink-jet printing head are clamped and additionally locked between these projections 4 and 5 and the upper inner side of the holding bracket 1.

The holding bracket 1 has at its upper side an electrical terminal carrier 6, which is provided with separate contact pins 7, through which an electrical connection to the electrically controllable printing elements in the interior of the ink-jet printing head can be established. Furthermore, an ink supply tube 8 is provided on the upper side of the holding bracket 1, which tube is connected via an ink supply system in the interior of the ink-jet printing head to the pressure chambers and the nozzles.

The interior of the holding bracket 1 first accommodates a bilaminar combination of a diaphragm plate 9 and a piezoceramic plate 10. The diaphragm plate 9 consists, for example, of a conducting metal layer, for example a nickel layer, and is applied by electroplating to the lower side of the piezoceramic plate 10. The plate combination 9, 10 is provided with an opening 11, through which the ink passed into the ink supply tube 8 flows into the ink supply system of the ink-jet printing head.

The piezoceramic plate 10 has separate embossed parts 12, which are arranged thereon as a matrix, i.e. in the form of columns and rows. These embossed parts 12 are obtained, for example, by sawing the piezoceramic plate 10. The plate 10 is sawn through for about 90% without the subjacent plate 9 being damaged. However, the embossed parts 12 may also be formed in a different manner, for example by a suitable exposure and subsequent etching process.

To the embossed parts 12 are applied film-shaped electrodes 13, through which in conjunction with the metallic diaphragm layer 9 an electrical field can be applied to each of the piezoceramic embossed parts 12. For this purpose, the electrode layers 13 are contacted with connection wires 14, which establish an electrical connection between the electrode layers 13 and further electrode layers 15, which are also arranged on piezoceramic embossed parts (further embossed parts 16). These further embossed parts 16 serve quasi as supporting points for the further electrode layers 15, from which the electrical connection leads 17 then extend to the plus contacts 7.

The piezoceramic embossed parts 12 are so arranged on the piezoceramic plate 10 that they are located accurately above the pressure chambers 18, which are provided within a body 19, on which the plate combination 9, 10 is provided. The pressure chambers 18 are of conical shape and extend, for example, at right angles to the plane of the plate 19. They have in the plane of the plate a circular cross-section. This cross-section is at the side *opposite to the diaphragm plate* 9 *of the same size as the* side length of a square embossed part 12 so that the latter completely covers the pressure chamber 18.

In order to avoid that the connection wires 14 adaversely affect the resonance properties of the embossed parts 12 to an impermissible extent, these wires are electrically connected to the relevant electrode layers 13 at the corner points of the embossed parts 12. A connection wire 14 consequently contacts an electrode layer 13 only in a range which is not located above a pressure chamber 18. Embossed parts 12 thus constructed and contacted behave with respect to their resonance properties practically exactly in the same manner as embossed parts completely adapted to the cross-section of the pressure chambers 18, i.e. circular-cylindrical embossed parts. However, from a given size, these parts can no longer be contacted with contact wires without further expedients because the connection wires then adversely affect the resonance conduct.

The pressure chambers 18 provided in the body 19 are interconnected in an ink supply system, which consists of separate ink supply ducts 20, 21. The body 19 may consist, for example, of etchable glass, silicon, steel or another hard material.

This body 19 may also be composed of two separate layers, one layer comprising the pressure chambers 18 and the second layer only comprising the ink supply system. At any rate, the thickness of the body 19 can be kept small so that a printing head of extremely small height is obtained.

Below the body 19 there is arranged a nozzle plate 22, whose nozzles 23 cover the pressure chambers 18 in the body 19. This nozzle plate 22 may be manufactured according to a conventional technology and is rigidly connected to the body 19 by suitable means. Pressure chambers 18 and nozzles 23 constitute an ink duct.

FIG. *2a* shows a diagonal sectional view of a piezoceramic embossed part 12 in the direction of the arrow A in FIG. 1, while FIG. *2b* is such a sectional view in the direction of the arrow B in FIG. 1. Like parts are provided with the same reference numerals.

As is clearly apparent from FIG. *2a*, the connection wire 14 is provided at an area of the electrode 13, for example by soldering or bonding, which is located laterally of the printing duct, which is constituted by the pressure chamber 18 and the nozzle 23. This connection wire 14 is passed, as already described, to an electrode layer 15, which is located on the further embossed part 16, which solely serves as a supporting point for the connection wire 14. This further electrode layer 15 is, for example, subdivided, as clearly appears from FIG. 1, so that two supporting contacts are formed thereby on the further embossed part 16.

In FIG. *2b*, the connection wire 14 is only seemingly located above the nozzle duct. It is rather located alsi in this case in fact beside the pressure chamber 18 because the piezoceramic embossed part 12 has a square cross-section and the pressure chamber 18 has a circular cross-section.

Figure 2A:
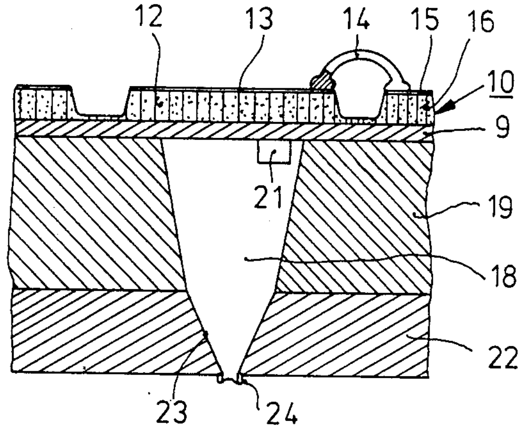
Figure 2B:
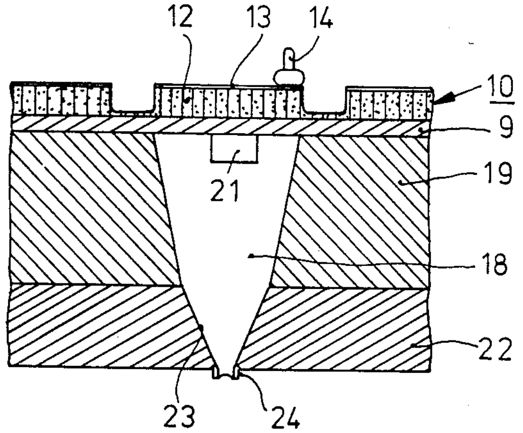

As further appears from FIGS. 2a and 2b, the ink supply ducts 21 empty at the upper side of the pressure chambers 18 into these chambers. As already described, they are connected through the supply duct 20 to the ink supply tube 8. In operation, the ink supply system and hence the pressure chambers 18 and the nozzles 23, respectively, are filled with ink. When an electrical voltage is applied to the piezoceramic embossed parts 12 through the electrode layers 13 and the conducting diaphragm plate 9, respectively, the embossed parts 12, which acts as pressure generators, are caused to produce resonances, which are transferred through the diaphragm plate 9 to the liquid in the interior of the pressure chambers 18. These resonances cause the ink to emanate from the pressure chambers 18 through the nozzles 23 and the adjoining nozzle edges 24. Due to the comparatively small length of the ink ducts, i.e. of the pressure chambers 18 and of the nozzles 23, very high drop rates of, for example, 10 kHz with simultaneously a high integration density of the ink ducts can be obtained with the ink-jet printing head described.

Of course the pressure chambers 18 may also be of cylindrical or of another suitable shape. The diaphragm plate 9 has, for example, a thickness of 50/μm, while the piezoceramic plate 10 and an embossed part 12, respectively, has a thickness of 100 to 200/μm. Of course the diaphragm plate 9 may also be replaced by a plate other than a plate applied by electroplating to the piezoceramic plate 10 and having other dimensions. The longitudinal dimensions of the piezoceramic embossed parts 12 lie about in the range of from 0.4 to 0.6 mm.

In order to further increase the integration density of such an ink-jet printing head, of course the further embossed parts 16 may also be omitted. In this case, the connection wires 14 are directly passed from the electrode layers 13 to the contact pins 7.

Figure 3A:
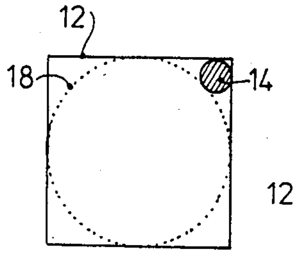
Figure 3B:
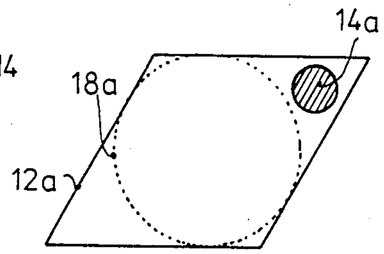
Figure 3C:
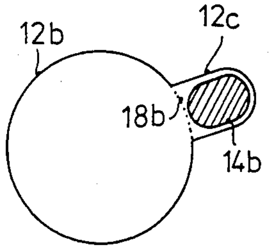

FIGS. 3a to c show several embodiments of the piezoceramic embossed parts of the piezoceramic plate 10. FIG. 3a shows the embossed part 12 of square form already disclosed, which is arranged above a pressure chamber 18 of circular cross-section. Its diameter corresponds to the side edge of the square embossed part 12. The connection wire 14 is connected to the film-shaped electrode applied to the embossed part 12 at an area which is located outside the pressure chamber 18.

FIG. 3b shows an oblique rhombic piezoceramic embossed part 12a, which is also located above a pressure chamber 18a of circular cross-section and covers it completely. A connection wire 14a is connected at the area outside the pressure chamber 18a to the electrode which is located on the embossed part 12a and which is limited by two sides of the embossed part 12a extending at an acute angle to each other.

Finally, FIG. 3c shows an also possible circular piezoceramic embossed part 12b, whose diameter corresponds to the diameter of the pressure chamber 18b located below it and which is provided with an additional tag 12c for contacting a connection wire 14b.

The ink-jet printing head according to the invention can be simple manufactured in mass production and at low cost and permits due to its small dimensions of obtaining very high drop rates. The size of the printing head is now of the order of conventional nozzle plates, but it is thicker than the latter.

What is claimed is:

1. An ink-jet printing head comprising:

a body having first and second opposite sides and a plurality of ink ducts extending therethrough, a corresponding plurality of nozzles each communicating with a respective duct, a corresponding plurality of pressure chambers, each having a given respective cross-sectional area and communicating with a respective duct, a common ink supply system connected to said ducts, a common diaphragm plate, and a one-piece piezoceramic plate connected to said diaphragm plate and having a respective embossed part disposed above the area of each pressure chamber, and a corresponding plurality of film-shaped electrodes, each overlying a respective embossed part and having a respective electrical connection, characterized in that each said embossed part extends beyond the area of the respective pressure chamber, and said electrical connections are connected to the respective electrodes outside the area above the respective pressure chambers, whereby a mass of the electrical connections does not affect the resonant frequency of the respective embossed part and pressure chamber.

2. A head as claimed in claim 1, characterized in that each of said embossed parts has a rhombic shape.

3. A head as claimed in claim 2, characterized in that said pressure chambers are arranged as a closely spaced matrix, and in that each nozzle is disposed to one side of said body directly opposite the respective pressure chamber.

4. A head as claimed in claim 3, characterized in that said piezoceramic plate carries further embossed parts, each having a respective film-shaped electrode, disposed between the pressure chambers.

5. A head as claimed in claim 4, characterized in that said diaphragm plate is formed by electroplating on the side of the piezoceramic plate remote from the embossed parts.

6. A head as claimed in claim 5, characterized in that said plate is a nickel layer.

7. A head as claimed in claim 6, characterized in that said matrix has a plurality of said ducts closely spaced in a longitudinal direction, each said embossed part has a longitudinal dimension from about 0.4 mm to 0.6 mm, and said diaphragm plate has a thickness, in the direction in which said ducts extend, of about 50/μm.

8. A head as claimed in claim 3, characterized in that said matrix has a plurality of said ducts closely spaced in a longitudinal direction, each said embossed part has a longitudinal dimension from about 0.4 mm to 0.6 mm, and said diaphragm plate has a thickness, in the direction in which said ducts extend, of about 50/μm.

9. A head as claimed in claim 3, characterized in that said diaphragm plate is formed by electroplating on the side of the piezoceramic plate remote from the embossed parts.

10. A head as claimed in claim 2, characterized in that said piezoceramic plate carries further embossed parts, each having a respective film-shaped electrode, disposed between the pressure chambers.

11. A head as claimed in claim 1, characterized in that said matrix has a plurality of said ducts closely spaced in a longitudinal direction, each said embossed part has a longitudinal dimension from about 0.4 mm to 0.6 mm, and said diaphragm plate has a thickness, in the direction in which said ducts extend, of about 50/μm.

12. A head as claimed in claim 1, characterized in that said diaphragm plate is formed by electroplating on the side of the piezoceramic plate remote from the embossed parts.

13. A head as claimed in claim 1, characterized in that said piezoceramic plate carries further embossed parts, each having a respective film-shaped electrode, disposed between the pressure chambers.

14. A head as claimed in claim 1, characterized in that said pressure chambers are arranged as a closely spaced matrix, and in that each nozzle is disposed to one side of said body directly opposite the respective pressure chamber.

* * * * *